(12) United States Patent
Liao et al.

(10) Patent No.: US 11,138,571 B2
(45) Date of Patent: Oct. 5, 2021

(54) BICYCLE REPAIR SYSTEM

(71) Applicant: China Construction Steel Structure Corp. Ltd., Guangdong (CN)

(72) Inventors: Xuanmao Liao, Guangdong (CN); Bingxing Hu, Guangdong (CN); Yulong Cai, Guangdong (CN); Changsheng Feng, Guangdong (CN); Weisheng Zheng, Guangdong (CN); Zhiyu Li, Guangdong (CN); Zezhen Rong, Guangdong (CN)

(73) Assignee: CHINA CONSTRUCTION STEEL STRUCTURE CORP. LTD., Guangdong (CN)

( * ) Notice: Subject to any disclaimer, the term of this patent is extended or adjusted under 35 U.S.C. 154(b) by 92 days.

(21) Appl. No.: 16/616,698

(22) PCT Filed: May 25, 2018

(86) PCT No.: PCT/CN2018/088503
§ 371 (c)(1),
(2) Date: Nov. 25, 2019

(87) PCT Pub. No.: WO2018/214976
PCT Pub. Date: Nov. 29, 2018

(65) Prior Publication Data
US 2020/0210969 A1 Jul. 2, 2020

(30) Foreign Application Priority Data
May 25, 2017 (CN) .......................... 201710377293.9

(51) Int. Cl.
*G06Q 10/00* (2012.01)
*G07C 9/38* (2020.01)
(Continued)

(52) U.S. Cl.
CPC ................ *G06Q 10/20* (2013.01); *G01L 5/00* (2013.01); *G07C 9/38* (2020.01); *G08B 7/06* (2013.01); *G08B 21/24* (2013.01)

(58) Field of Classification Search
CPC ...... G06Q 10/20; G07C 9/38; G07C 9/00912; G07C 9/00571; G07C 9/00896;
(Continued)

(56) References Cited

U.S. PATENT DOCUMENTS 9,646,165 B1 * 5/2017 Saylor ................ G07C 9/00904
2011/0291848 A1 * 12/2011 Burdenko ............... E05C 19/16
340/665

(Continued)

FOREIGN PATENT DOCUMENTS

CN 204282989 U * 4/2015
CN 105584467 5/2016
(Continued)

OTHER PUBLICATIONS

International Search Report issued in co-pending application No. PCT/CN2018/088503 dated Aug. 29, 2018.

*Primary Examiner* — Brian Wilson
(74) *Attorney, Agent, or Firm* — Whiteford, Taylor & Preston, LLP; Peter J. Davis

(57) ABSTRACT

A bicycle repair system comprises an intelligent bicycle locking device, an intelligent toolbox, and a central processing unit. The intelligent bicycle locking device is connected to the central processing unit, and the intelligent toolbox is connected to the central processing unit. The intelligent bicycle locking device is configured to send an obtained first user information to the central processing unit. The intelligent toolbox is configured to send an obtained second user information to the central processing unit. The central processing unit is configured to determine whether the second user information is the same as the first user information (Continued)

and, if yes, send an opening instruction to the intelligent toolbox sending the second user information, so as to help a user to repair a damaged bicycle by using the intelligent toolbox, so that the bicycle can be repaired without depending on a repair person, thereby improving the repair efficiency.

7 Claims, 2 Drawing Sheets

(51) Int. Cl.
  *G01L 5/00* (2006.01)
  *G08B 7/06* (2006.01)
  *G08B 21/24* (2006.01)

(58) Field of Classification Search
  CPC ......... G07C 9/00174; G01L 5/00; G08B 7/06; G08B 21/24
  See application file for complete search history.

(56) References Cited

U.S. PATENT DOCUMENTS

| 2015/0298314 | A1* | 10/2015 | DeBaker | B25H 1/0014 |
| | | | | 141/4 |
| 2018/0014778 | A1* | 1/2018 | Cronin | G16H 40/67 |
| 2018/0100933 | A1* | 4/2018 | Xia | B62J 45/00 |

FOREIGN PATENT DOCUMENTS

| CN | 105584467 A | * 5/2016 |
| CN | 107240174 | 10/2017 |
| JP | 2013076223 | 4/2013 |

* cited by examiner

BICYCLE REPAIR SYSTEM

CROSS-REFERENCE TO RELATED APPLICATION

This application claims priority to Chinese Patent Application No. 201710377293.9, "BICYCLE REPAIR SYSTEM", filed May 25, 2017 to the Patent Office of China, the entire contents of which are incorporated herein by reference.

TECHNICAL FIELD

The present application relates to the field of bicycles, and more particularly, to a bicycle repair system.

BACKGROUND

Nowadays, there are more shared bicycles which have become an important transportation means, but with the increase of a usage rate, a damage rate of the shared bicycles has also increased accordingly, thereby affecting people's travel. However, an existing repair method is to upload information of a damaged shared bicycle to a server, and a repair person can only repair according to the information uploaded by the server with low repair efficiency.

Therefore, there are technical problems in the prior art that bicycle repair can only be performed by the repair person and the repair efficiency is low.

SUMMARY

The present application is mainly intended to provide a bicycle repair system, and aims at solving the technical problems in the prior art that bicycle repair can only be performed by a repair person and a repair efficiency is low.

In order to achieve the objective above, the present application provides a bicycle repair system, which comprises a central processing unit;

an intelligent bicycle locking device connected to the central processing unit, configured to send an obtained first user information to the central processing unit; and an intelligent toolbox connected to the central processing unit, configured to send an obtained second user information to the central processing unit;

wherein the central processing unit is configured to determine whether the second user information is the same as the first user information and, if yes, send an opening instruction to the intelligent toolbox sending the second user information.

Optionally, a sensing device is arranged in a lockhole of the intelligent toolbox, the sensing device is configured to send an obtained sensing data to the central processing unit, and the central processing unit determines whether the intelligent toolbox is locked based on the sensing data.

Optionally, the sensing device is a pressure sensor.

Optionally, the intelligent toolbox is provided with an alarm which is connected to the central processing unit and the sensing device in the intelligent toolbox.

Optionally, the intelligent bicycle locking device comprises a microprocessor and a buckle; and the microprocessor is respectively connected to the central processing unit and the buckle, and the microprocessor is configured to control the opening or closing of the buckle according to an instruction sent by the central processing unit.

Optionally, the intelligent toolbox also comprises a screwdriver, a wrench, pliers, an air pump, sharp-nosed scissors and a tire spoon.

Optionally, the screwdriver, the wrench, the pliers, the air pump, the sharp-nosed scissors and the tire spoon are respectively connected to the intelligent toolbox through a cable.

The bicycle repair system provided by the present application comprises the intelligent bicycle locking device, the intelligent toolbox, and the central processing unit, wherein the intelligent bicycle locking device is connected to the central processing unit, the intelligent toolbox is connected to the central processing unit, the intelligent bicycle locking device is configured to send the obtained first user information to the central processing unit, the intelligent toolbox is configured to send the obtained second user information to the central processing unit, and the central processing unit is configured to determine whether the second user information is the same as the first user information and, if yes, send the opening instruction to the intelligent toolbox sending the second user information. Compared with the prior art, according to the present application, the first user information obtained by the intelligent bicycle locking device and the second user information obtained by the intelligent toolbox are compared through the central processing unit, and if comparison results are the same, the intelligent toolbox is opened to facilitate a user to repair a damaged bicycle by using the intelligent toolbox, so that the bicycle repair can be performed without relying on the repair person, thereby improving the repair efficiency.

BRIEF DESCRIPTION OF THE DRAWINGS

In order to more clearly illustrate the technical solutions in the embodiments of the present application or the prior art, the drawings to be used in the embodiments or the description of the prior art will be briefly introduced below. Obviously, the drawings in the following description merely indicate some embodiments of the present application, and those skilled in the art can further obtain other drawings according to these drawings without going through any creative work.

DETAILED DESCRIPTION

In order to make the objective, feature and advantage of the present application more obvious and understandable, the technical solutions in the embodiments of the present application are clearly and completely described hereinafter with reference to the drawings in the embodiments of the present application. Obviously, the described embodiments are only some but not all of the embodiments of the present application. Based on the embodiments in the present application, all other embodiments obtained by those skilled in the art without making creative works shall belong to the protection scope of the present application.

In order to describe the technical solutions of the present application, the description is made by specific embodiments hereinafter.

Figure 1:
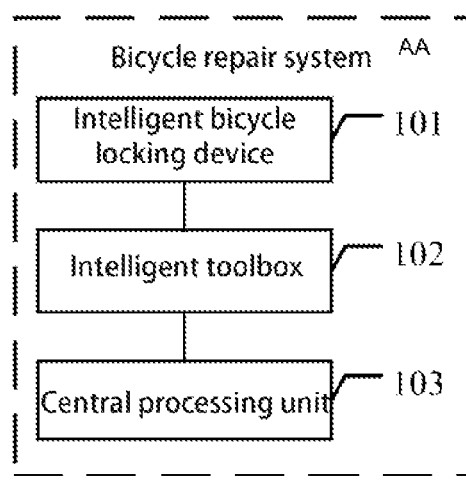
FIG. 1 is a structure diagram of a bicycle repair system provided in a first embodiment of the present application.

With reference to FIG. 1, FIG. 1 is a structure diagram of a bicycle repair system according to a first embodiment of the present application, and the bicycle repair system comprises an intelligent bicycle locking device 101, an intelligent toolbox 102, and a central processing unit 103.

The intelligent bicycle locking device 101 is connected to the central processing unit 103, and the intelligent toolbox 102 is connected to the central processing unit 103.

The intelligent bicycle locking device 101 is configured to send an obtained first user information to the central processing unit 103.

The intelligent toolbox 102 is configured to send an obtained second user information to the central processing unit 103.

The central processing unit 103 is configured to determine whether the second user information is the same as the first user information and, if yes, send an opening instruction to the intelligent toolbox 102 sending the second user information.

In the embodiment of the present application, the intelligent bicycle locking device 101 is connected to the central processing unit 103, and a user scans a two-dimensional code on the intelligent bicycle locking device 101 through a client APP, so that the intelligent bicycle locking device 101 obtains the first user information of the user. The intelligent bicycle locking device 101 sends the first user information to the central processing unit 103, the intelligent toolbox 102 is connected to the central processing unit 103, and the user scans a two-dimensional code on the intelligent toolbox 102 through the client APP, so that the intelligent toolbox 102 obtains the second user information of the user. The intelligent toolbox 102 sends the second user information to the central processing unit 103, and the central processing unit 103 determines whether the second user information is the same as the first user information and, if yes, the central processing unit 103 sends the opening instruction to the intelligent toolbox 102 sending the second user information to open the intelligent toolbox 102 sending the second user information, and if no, the central processing unit 103 does not send the opening instruction to the intelligent toolbox 102 sending the second user information, so that the intelligent toolbox 102 sending the second user information cannot be opened.

The bicycle repair system comprises at least one intelligent bicycle locking device, at least one intelligent toolbox and the central processing unit 103.

It shall be noted that the first user information is the same as the second user information, and may comprise information such as a user's mobile phone number and a terminal model.

Further, a sensing device is arranged in a lockhole of the intelligent toolbox 102, the sensing device is configured to send an obtained sensing data to the central processing unit 103, and the central processing unit 103 determines whether the intelligent toolbox 102 is locked based on the sensing data.

In the embodiment of the present application, the sensing device is arranged in the lockhole of the intelligent toolbox 102, and the sensing device is a pressure sensor. After the sensing device sends the obtained sensing data to the central processing unit 103, the central processing unit 103 determines whether a magnitude of the sensing data is greater than or equal to a preset threshold value, if the sensing data is greater than the preset threshold value, the intelligent toolbox 102 is locked, and if the sensing data is less than the preset threshold value, the intelligent toolbox 102 is not locked.

The preset threshold value is preset by a bicycle manufacturer, which can be adjusted according to actual conditions.

Further, the intelligent toolbox 102 is provided with an alarm which is respectively connected to the central processing unit 103 and the sensing device in the intelligent toolbox 102.

In the embodiment of the present application, the intelligent toolbox 102 is provided with the alarm, if the central processing unit 103 determines that the sensing data sent by the sensing device has been less than the preset threshold value in a preset time period, the intelligent toolbox 102 has not been locked in the preset time period, the central processing unit 103 sends a warning instruction to the alarm, the alarm performs an acousto-optical warning operation according to the warning instruction, and when the user hears warning sound and sees warning light, the user can lock the intelligent toolbox conveniently.

In the embodiment of the present application, compared with the prior art, the first user information obtained by the intelligent bicycle locking device and the second user information obtained by the intelligent toolbox are compared through the central processing unit, and if comparison results are the same, the intelligent toolbox is opened to facilitate the user to repair the damaged bicycle by using the intelligent toolbox, so that the bicycle repair can be performed without relying on the repair person, thereby improving the repair efficiency.

Figure 2:
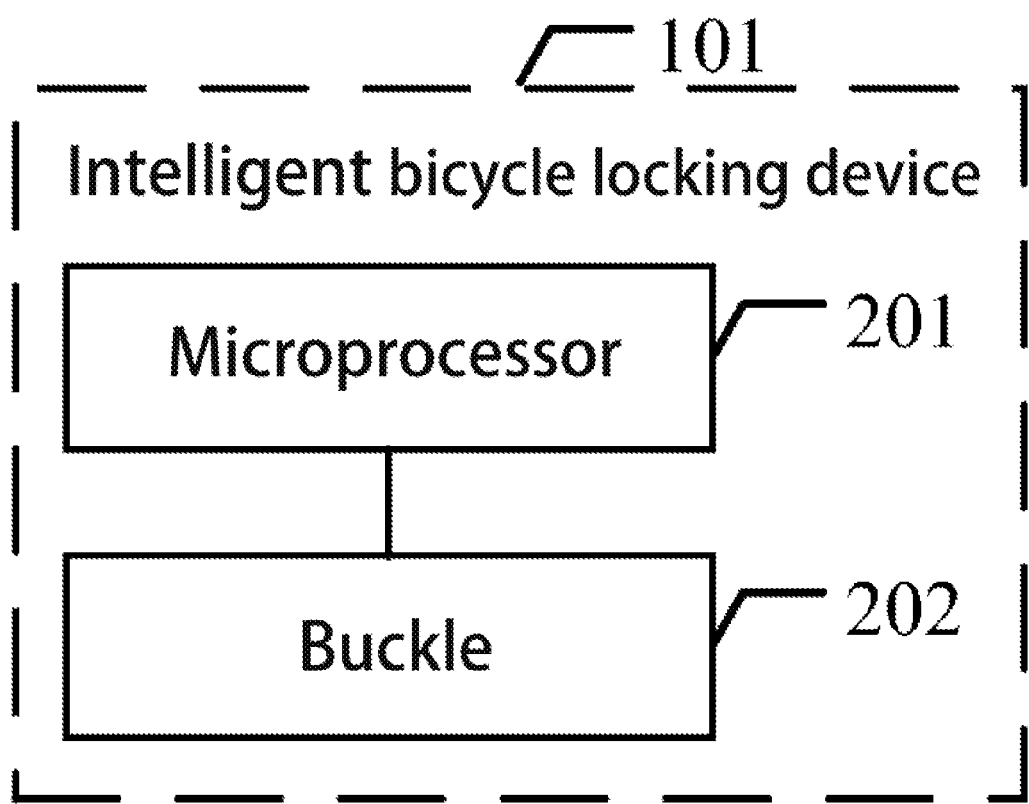
FIG. 2 is a detailed structure diagram of an intelligent unlocking device 101 in FIG. 1.

Further, with reference to FIG. 2, FIG. 2 is a detained structure diagram of an intelligent bicycle locking device 101, which comprises a microprocessor and a buckle, and specifically, the microprocessor 201 is respectively connected to the central processing unit 103 and the buckle 202, and the microprocessor 201 is configured to control the opening or closing of the buckle 202 according to an instruction sent by the central processing unit 103.

In the embodiment of the present application, when a bicycle used by the user is damaged and the user needs to open the intelligent toolbox 102, the user firstly scans the two-dimensional code on the intelligent bicycle locking device 101 through the client APP, so that the intelligent bicycle locking device 101 obtains the first user information of the user. The user clicks a closing instruction on the client APP to send the closing instruction to the central processing unit 103, the central processing unit 103 sends the closing instruction to the microprocessor 201, and the microprocessor 201 controls closing of the buckle based on the closing instruction. After closing, the user scans the two-dimensional code on the intelligent toolbox 102 through the client APP, so that the intelligent toolbox 102 obtains the second user information of the user. The intelligent toolbox 102 sends the second user information to the central processing unit 103, the central processing unit 103 determines whether the second user information is the same as the first user information and, if yes, the central processing unit 103 sends the opening instruction to the intelligent toolbox 102 sending the second user information to open the intelligent toolbox 102 sending the second user information.

For example, in a process of riding a bicycle, if the bicycle is damaged, the user needs to lock the bicycle and open the intelligent toolbox 102 to repair the locked bicycle. The user firstly scans the two-dimensional code on the intelligent bicycle locking device 101 through the client APP downloaded in a terminal, so that the intelligent bicycle locking device 101 obtains the first user information of the user. The intelligent bicycle locking device 101 sends the first user information to the central processing unit 103, the user clicks the closing instruction on the client APP to send the closing instruction to the central processing unit 103, the central processing unit 103 sends the closing instruction to the microprocessor 201, and the microprocessor 201 controls closing of the buckle based on the closing instruction. After locking the damaged bicycle, the user needs to open the intelligent toolbox 102, and then the user scans the two-dimensional code on the intelligent toolbox 102 through the client APP downloaded in the terminal, so that the intelligent toolbox 102 obtains the second user information of the user. The intelligent toolbox 102 sends the second user information to the central processing unit 103, and the central processing unit 103 determines whether the second user information is the same as the first user information. Because the same user scans the two-dimensional code on the intelligent bicycle locking device 101 and the two-dimensional code on the intelligent toolbox 102 by the client APP on the same terminal, if the first user information is the same as the second user information, the central processing unit 103 sends the opening instruction to the intelligent toolbox 102 sending the second user information to open the intelligent toolbox 102 sending the second user information.

Further, after the user closes the intelligent toolbox, the two-dimensional code on the intelligent bicycle locking device 101 is scanned again through the client APP, so that the intelligent bicycle locking device 101 obtains the first user information of the user and sends the first user information to the central processing unit 103, the central processing unit 103 automatically sends the opening instruction to the microprocessor 201, and the microprocessor 201 controls opening of the buckle based on the opening instruction.

When the user does not close the intelligent toolbox 102, if the user scans the two-dimensional code on the intelligent bicycle locking device 101 again through the client APP, the intelligent bicycle locking device 101 obtains the first user information of the user and sends the first user information to the central processing unit 103, and the central processing unit 103 does not send the opening instruction to the microprocessor 201 to prevent the user from riding the bicycle without closing the intelligent toolbox 102.

When the intelligent toolbox is in a closed state, the user no longer uses the bicycle, and when other users need to use the bicycle, the other users scan the two-dimensional code on the intelligent bicycle locking device 101 through the client APP downloaded in their own terminals, so that the intelligent bicycle locking device 101 obtains third user information of the user and sends the third user information to the central processing unit 103. The user also needs to click the opening instruction on the client APP to send the opening instruction to the central processing unit 103, the central processing unit 103 sends the opening instruction to the microprocessor 201, and the microprocessor 201 controls opening of the buckle based on the opening instruction.

It shall be noted that the third user information is different from the first user information, but also comprises information such as a new user's mobile phone number and a terminal model.

Further, the intelligent toolbox also comprises a screwdriver, a wrench, pliers, an air pump, sharp-nosed scissors and a tire spoon, and the screwdriver, the wrench, the pliers, the air pump, the sharp-nosed scissors and the tire spoon are respectively connected to the intelligent toolbox through a cable.

In the embodiment of the present application, the screwdriver, the wrench, the pliers, the air pump, the sharp-nosed scissors and the tire spoon are respectively connected to the intelligent toolbox through the cable to prevent the user from not returning the screwdriver, the wrench, the pliers, the air pump, the sharp-nosed scissors and the tire spoon completely. When the cable is damaged, a damage instruction can be sent to the central processing unit 103, the central processing unit 103 sends the damage instruction to the alarm arranged on the intelligent toolbox, and the alarm performs acousto-optical warning according to the damage instruction, so as to prevent a lawbreaker from damaging the cable and taking away the screwdriver, the wrench, the pliers, the air pump, the sharp-nosed scissors and the tire spoon.

In the several embodiments provided in the present application, it should be understood that the disclosed apparatus and method may be implemented in other manners. For example, the apparatus embodiments described above are merely illustrative. For example, the division of the modules is only one logical function division. In practice, there may be another division manner. For example, multiple modules or components may be combined or integrated into another system, or some features may be ignored or not performed. In addition, the illustrated or discussed mutual coupling or direct coupling or communication connection may be indirect coupling or communication connection through some interfaces, apparatuses or modules, and may be in electrical, mechanical or other forms.

The modules described as separated parts may or may not be physically separated, and the parts displayed as modules may or may not be physical modules, that is, may be located in one place, or may be distributed on multiple network modules. Some or all of the modules may be selected according to actual needs to achieve the objectives of the solutions in the embodiments.

In addition, each functional module in each embodiment of the present application may be integrated in one processing module, or each module may exist alone physically, or two or more modules may be integrated in one module. The integrated modules above may be implemented in the form of hardware, or in the form of software functional modules.

The integrated modules may also be stored in a computer-readable storage medium if being implemented in the form of a software functional module and sold or used as an independent product. Based on such understanding, the essence of the technical solutions of the present application, or the part contributing to the prior art or all or a part of the technical solutions, may be embodied in the form of a software product. The computer software product is stored in a storage medium including a number of instructions such that a computer device (which may be a personal computer, a server, or a network device, etc.) performs all or a part of steps of the method described in each of the embodiments of the present application. The foregoing storage medium includes: any medium that is capable of storing program codes such as a USB disk, a mobile hard disk, a Read-Only Memory (ROM), a Random Access Memory (RAM), a magnetic disk or an optical disk, and the like.

It should be noted that, for the sake of simple description, the fore-mentioned method embodiments are all expressed as a series of action combinations, but those skilled in the art should understand that the embodiments of the present application are not limited by the described action sequences, because certain steps may be performed in other sequences or concurrently according to the embodiments of the present application. Secondly, those skilled in the art should also understand that all the embodiments described in the specification are preferred embodiments, and the actions and modules involved are not necessarily required by the embodiments of the present application.

In the above-mentioned embodiments, the description of each embodiment has its own emphasis. For parts not detailed in one embodiment, please refer to the related description of other embodiments.

The above describes the bicycle repair system provided by the present application. For those of ordinary skills in the art, there will be changes in the specific implementation and application scope according to the idea of the embodiments of the present application. To sum up, the contents of this specification should not be construed as limiting the present application.

What is claimed is:

1. A bicycle repair system, comprising:
a central processing unit;
an intelligent bicycle lock connected to the central processing unit, configured to obtain and further send first user information to the central processing unit; and
an intelligent toolbox connected to the central processing unit, configured to obtain and further send second user information to the central processing unit;
wherein the central processing unit is configured to determine whether the second user information is the same as the first user information and, if yes, send an opening instruction to the intelligent toolbox to unlock the intelligent toolbox.

2. The bicycle repair system according to claim 1, wherein a sensing device is arranged in a lockhole of the intelligent toolbox, the sensing device is configured to send an obtained sensing data to the central processing unit, and the central processing unit determines whether the intelligent toolbox is locked based on the sensing data.

3. The bicycle repair system according to claim 2, wherein the sensing device is a pressure sensor.

4. The bicycle repair system according to claim 3, wherein the intelligent toolbox is provided with an alarm which is respectively connected to the central processing unit and the sensing device in the intelligent toolbox.

5. The bicycle repair system according to claim 1, wherein the intelligent bicycle lock comprises a microprocessor and a buckle; and
the microprocessor is respectively connected to the central processing unit and the buckle, and the microprocessor is configured to control the opening or closing of the buckle according to an instruction sent by the central processing unit.

6. The bicycle repair system according to claim 1, wherein the intelligent toolbox also comprises a screwdriver, a wrench, pliers, an air pump, sharp-nosed scissors and a tire spoon.

7. The bicycle repair system according to claim 6, wherein the screwdriver, the wrench, the pliers, the air pump, the sharp-nosed scissors and the tire spoon are respectively connected to the intelligent toolbox through a cable.

* * * * *